United States Patent [19]

Kotchick

[11] Patent Number: 4,816,036
[45] Date of Patent: Mar. 28, 1989

[54] FABRICATION OF CERAMIC TRILAYERS FOR A MONOLITHIC SOLID OXIDE FUEL CELL

[75] Inventor: David M. Kotchick, San Pedro, Calif.

[73] Assignee: Allied-Signal Inc., Morris Township, Morris County, N.J.

[21] Appl. No.: 941,492

[22] Filed: Dec. 15, 1986

[51] Int. Cl.[4] .......................... H01M 8/12; H01M 8/24
[52] U.S. Cl. ..................................... 29/623.3; 429/30; 429/34
[58] Field of Search .............................. 429/32, 30, 34; 29/623.1, 623.2, 623.3, 623.4, 623.5

[56] References Cited

U.S. PATENT DOCUMENTS

| | | |
|---|---|---|
| 4,413,041 | 11/1983 | Hegedus . |
| 4,476,197 | 10/1984 | Herceg ................................. 429/32 |
| 4,476,198 | 10/1984 | Ackerman et al. ................... 429/32 |
| 4,749,632 | 6/1988 | Flandermeyer et al. ............. 429/12 |

OTHER PUBLICATIONS

EPO citation sheet.

Primary Examiner—Donald L. Walton
Attorney, Agent, or Firm—J. H. Muetterties; David B. Abel; James W. McFarland

[57] ABSTRACT

A monolithic solid oxide fuel cell of the type characterized by a plurality of fuel and oxidant passageways extending through the core of the fuel cell. The fuel cell is constructed only of anode, cathode, electrolyte and interconnect materials and is formed with integral manifolding for parallel flow through the core. The cell is constructed using alternatively stacked electrolyte walls and interconnect walls which are themselves multilayer tapes formed by roll milling individual tapes of a desired material, and then roll milling the multilayer tape from the tapes of a single material. A manufacturing process is also disclosed.

27 Claims, 5 Drawing Sheets

FABRICATION OF CERAMIC TRILAYERS FOR A MONOLITHIC SOLID OXIDE FUEL CELL

BACKGROUND OF THE INVENTION

This invention relates to solid oxide fuel cells and more particularly to a method of fabricating the fuel cell core.

A fuel cell is basically a galvanic conversion device that chemically reacts hydrogen or a hydrocarbon fuel and an oxidant within catalytic confines to produce a DC electrical output. In a fuel cell, cathode material defines the passageways for the oxidant and anode material defines the passageways for the fuel, and an electrolyte separates the cathode and anode materials. The fuel and oxidant, typically as gases, are continuously passed through the cell passageways separated from one another, and the fuel and oxidant discharge from the fuel cell generally remove the reaction products and heat generated in the cell. The fuel and oxidant are the working gases and as such are typically not considered an integral part of the fuel cell itself.

The type of fuel cell for which this invention has direct applicability is known as the solid electrolyte or solid oxide fuel cell, where the electrolyte is in solid form in the fuel cell. In the solid oxide fuel cell, hydrogen or a high order hydrocarbon is used as the fuel and oxygen or air is used as the oxidant, and the operating temperature of the fuel cell is between 700° and 1,100° C.

The hydrogen passing through the fuel cell reacts with oxide ions on the anode (the negative electrode) to yield water which is carried off in the fuel flow stream with the release of electrons into the anode material, and the oxygen reacts with the electrons on the cathode surface to form the oxide ions which pass into the cathode material. Electrons flow from the anode through an appropriate external load to the cathode, and the circuit is closed internally by the transport of oxide ions through the electrolyte. The electrolyte insulates the cathode and anode from one another with respect to electron flow, but permits oxygen ions to flow from the cathode to the anode. Thus, the reactions are, at the:

cathode: $\frac{1}{2} O_2 + 2e^- \rightarrow O^{-2}$ anode: $H_2 + O^{-2} \rightarrow H_2O + 2e^-$.

The overall cell reaction is

$H_2 + \frac{1}{2} O_2 \rightarrow H_2O$.

In addition to hydrogen, the fuel can be derived from a hydrocarbon such as methane ($CH_4$) reformed by exposure to steam at 390° C. or above, which initially produces carbon monoxide (CO) and three molecules of hydrogen. As hydrogen is consumed, a shift in reaction occurs to $CO + H_2O \rightarrow CO_2 + H_2$.

The overall reaction of hydrocarbons in the cell is illustrated by $CH_4 + 2O_2 \rightarrow CO_2 + 2H_2O$.

Inasmuch as the conversion within the fuel cell is electrochemical, the thermal limitations of the Carnot cycle are circumvented; therefore efficiencies in the range exceeding 50% fuel heat energy conversion to electrical output can be obtained. This is much higher than equivalent thermal engines utilizing the same fuel conversion, including even a conventional diesel powered engine.

The electrolyte isolates the fuel and oxidant gases from one another while providing a medium allowing oxygen ion transfer, as well as voltage buildup on opposite sides of the electrolyte. The electrodes (cathode and anode) provide paths for the internal movement of electrical current within the fuel cell to the cell terminals, which also connect with an external load. The operating voltage across each cell is on the order of 0.7 volts maximum, so the individual cells must be placed in electrical series to obtain a useful load voltage. Diffusion of the working gases (hydrogen or oxygen) through the electrodes to the electrolyte also limits the cell performance. However, fuel and oxidant must diffuse away from the flow stream in the respective passageways through the electrode to the reaction sites. The fuel and oxidant diffuse through the electrodes to the electrolyte and react at or near the three-phase boundary of the gases, the electrodes (anode or cathode), and electrolyte, whereat electrochemical conversion occurs.

While it is possible to thermally and electrically extract great quantities of energy from the fuel, it is also inherently inefficient to extract such energies to the complete depletion of the fuel and oxidant. As the hydrogen partial pressure of the fuel gases decreases along the length of the fuel passageways, less voltage is generated near or at the downstream end of the fuel passageways. Complete conversion of the fuel in the fuel cell is thus not sought as it is intrinsically inefficient in the overall output of the cell voltage. For both a single cell and cells in gas flow series, the maximum theoretical voltage decreases along the length of the cell. Practical fuel cells therefore consume 80 to 90% of the fuel because the cell voltage decreases rapidly as the hydrogen becomes less than 5% of the fuel gas. The reduction in maximum cell voltage as the fuel is consumed is an important limitation.

Past fuel cell designs have centered on a series of solid oxide fuel cells utilizing a ceramic support tube, and the electrodes (anode and cathode) and electrolyte built up as layers on the support tube. The support tube is confined in a sealed housing, and the fuel and oxidant are manifolded to the housing and the reaction products are ported from the housing as required. Depending on the layer build-up, the fuel is either conveyed internally of the support tube and the oxidant is conveyed externally of the support tube (or vice versa). A practical fuel cell unit would be composed of many such tubes supported within an exterior housing, and manifolding would separate and direct the fuel and oxidant proximate the tubes.

A typical support tube might be formed of calcium stabilized zirconia ($ZrO_2 + CaO$); the cathode typically would be applied to the exterior face of the support tube and might be in the form of lanthanum manganite ($LaMnO_3$) the electrolyte would be layered over a portion of the cathode, comprised, for example, of yttria stabilized zirconia ($ZrO_2 + Y_2O_3$); and the anode would be layered over the electrolyte comprised, for example, of a cobalt yttria-stabilized zirconia cermet or mixture ($Co + ZrO_2 + Y_2O_3$). The oxidant would thereby flow internally of the structural tube while fuel will be circulated externally of the tube. For part of the cell where a series connection is to be made with an adjacent cell, the interconnection would be layered over the cathode at this location instead of the electrolyte and anode, to engage the anode of the adjacent cell. The interconnect might be comprised for example, of lanthanum chromite ($LaCrO_3$).

To form this type of fuel cell, the support tube must be formed with a high degree of porosity. Even with 40% porosity, the layered anode and cathode represent large diffusion barriers. The diffusion losses increase very steeply at high current densities and represent a limit on current and hence power. The minimum size of the support tube has been about 1 cm in diameter, with a side wall about 1 mm thick. A limiting factor of this support tube core arrangement is the length of path that the current must pass along the cathode and anode materials thereby inducing significant electrical resistance losses. In one effort to minimize this, the respective tubes have been shortened lengthwise and stacked end-to-end on one another, and the anodes and cathodes of the successive respective tubes have been interconnected in a serial fashion with an interconnect. This renders a single tube through which the fuel and/or oxidant passes, while the serial connection produces a higher voltage cumulative of the total number of serially interconnected individual tubes. The current flow is in line with the direction of the fuel and/or oxidant flow, namely axially of the tube configuration.

Moreover, the tube supports are nonproductive and heavy so that the power and energy densities suffer when compared to other forms of energy conversion, including even the liquid electrolyte fuel cells more commonly operated at lower temperatures.

In contrast to the tubular type fuel cells of the prior art, the cellular type fuel cell cores (see U.S. Pat. No. 4,476,198) of the prior art are made by the process whereby the compositions used for the four materials are put into four distinct slurries. Each slurry is then placed in a reservoir of a squeegee-type device which is pulled over a flat surface. A film of the material is deposited on the flat surface and hardens or plasticizes into a layer of the material having the desired thickness. In this manner the electrolyte wall or interconnect wall is formed by a first layer of anode material followed by a layer of either electrode or interconnect material and finally by a layer of the cathode material. The layers are bonded together since the binder system is the same in each layer.

U.S. Pat. No. 4,476,198 (Ackerman, et al) discloses a monolithically formed core consisting only of materials active in the electrochemical reactions. This means that the electrolyte and interconnect walls of the core would be formed respectively, only of anode and cathode materials layered on the opposite sides of electrolyte material, or on the opposite sides of interconnect material. This allows the use of very thin material layers and very thin resulting composite core walls. Each layer of anode and cathode is deposited on the electrolyte or inerconnect material using a stencil or template device. The thin composite core walls can be shaped to define small passageways, while yet having sufficient structural integrity to withstand the fluid pressures generated by gas flow through the passageways and the mechanical stresses due to the weight of the stacked core walls on one another. This beneficially increases the power density of the fuel cell because of its reduced size and weight.

U.S. Pat. No. 4,476,196 (Poeppel, et al) discloses a monolithic core construction having the flow passageways for the fuel and for the oxidant gases extended transverse to one another, whereby full face core manifolding can be achieved for these gases and their reaction products. The core construction provides that only anode material surround each fuel passageway and only cathode material surround each oxidant passageway, each anode and each cathode material further being sandwiched at spaced opposing sides between electrolyte and interconnect materials. These composite anode and cathode wall structures are further alternately stacked on one another (with the separating electrolyte or interconnect material typically being a single common layer) whereby the fuel and oxidant passageways are disposed transverse to one another.

U.S. Pat. No. 4,510,212 (Fraioli) discloses a core construction having both parallel and cross flow paths for the fuel and the oxidant gases. Each interconnect wall of the cell is formed as a sheet of inert support material having therein spaced small plugs of interconnect material, the cathode and anode materials being formed as layers on opposite sides of each sheet and being electrically contacted together by the plugs of the interconnect material. Each interconnect wall in a wavy shape is connected along spaced, generally parallel, line-like contact areas between corresponding spaced pairs of generally parallel electrolyte walls, operable to define one tier of generally parallel flow passageways for the fuel and oxidant gases. Alternate tiers are arranged to have the passageways disposed normal to one another.

SUMMARY OF THE INVENTION

This invention relates to a solid oxide fuel cell and particularly to an improved method of making a core for such a cell.

An object of this invention is to provide an improved method for making a solid oxide fuel cell core of a complicated and compact cross section having many adjacent small passageways for containing the fuel and oxidant gases.

It is another object of this invention to provide a monolithic fuel cell core fabricated according to this invention which is comprised solely and exclusively of the active anode, cathode, electrolyte and interconnect materials, and with no nonactive materials for support.

It is a further object of this invention to provide a method for fabricating a solid oxide fuel cell core having thin electrolyte and interconnect walls, each comprised respectively of the anode and cathode materials layered onto opposite sides of the electrolyte and interconnect materials.

A monolithic solid oxide fuel cell is comprised of a core and inlet and outlet manifolds for both a fuel and an oxidant. The core includes a plurality of electrolyte walls and interconnect walls. The electrolyte walls comprise a layer of electrolyte material sandwiched between layers of anode and cathode material while the interconnect walls comprise a layer of interconnect material sandwiched between a layer of anode and cathode material. One or both of said electrolyte and interconnect walls are shaped such that when the interconnect walls are alternately stacked with the electrolyte walls a plurality of fuel passages and oxidant passages are formed. Each fuel passage being defined only by anode material and each oxidant passage being defined only by cathode material. The fuel cell further includes means to direct the galvanic output from the anode and cathode materials to an electrical power absorber or to a storage battery.

The method of fabricating the fuel cell core comprises the steps of individually mixing the anode, cathode, electrolyte and interconnect materials with a binder system to form a mass having a plastic consistency and then roll milling single layer tapes of each material. Three of said single layer tapes are then roll milled into a trilayer tape; i.e. electrolyte and interconnect walls. Thereafter, cutting each to the appropriate size and molding one or both into the desired wall shape. The formed electrolyte walls are alternately stacked with the formed interconnect walls until the fuel cell core of the desired size is obtained. The fuel cell core is then subjected to a controlled heat up cycle in order to first remove the binder therefrom and then at a higher frequency sintering the core in order to fuse the remaining ceramic particles which are in contact with one another.

DETAILED DESCRIPTION OF THE INVENTION

Figure 1:
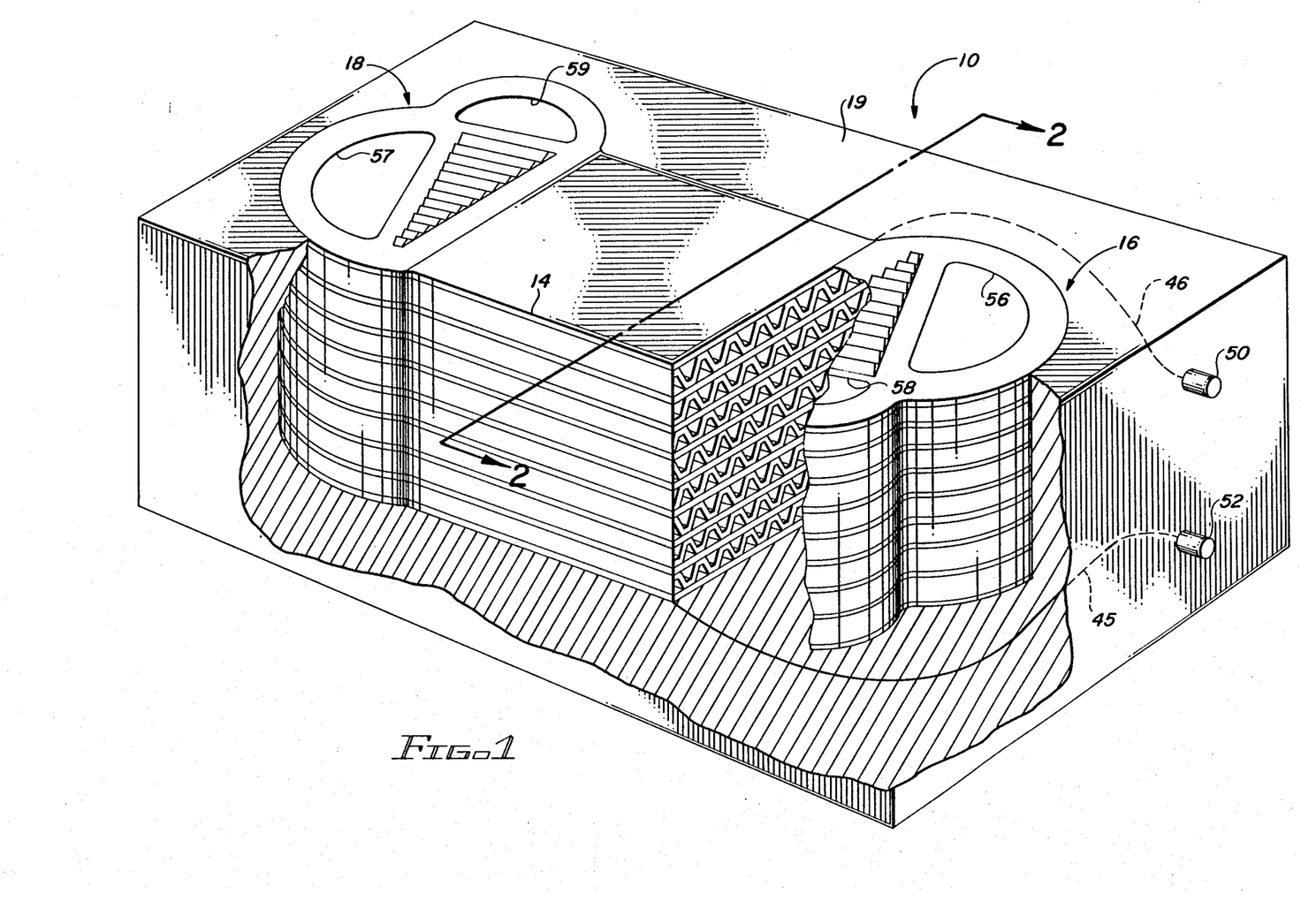
FIG. 1 is a perspective view, partially broken away for clarity of a fuel cell formed according to the present invention.

FIG. 1 shows a monolithic solid oxide full cell 10 of the present invention including a fuel cell core 14 and inlet and outlet manifolding, 16 and 18, at each end of the core 14. The core and manifolds are located within and surrounded by suitable insulation 19. Not shown are supply lines connected to suitable fuel and oxidant sources.

Figure 2:
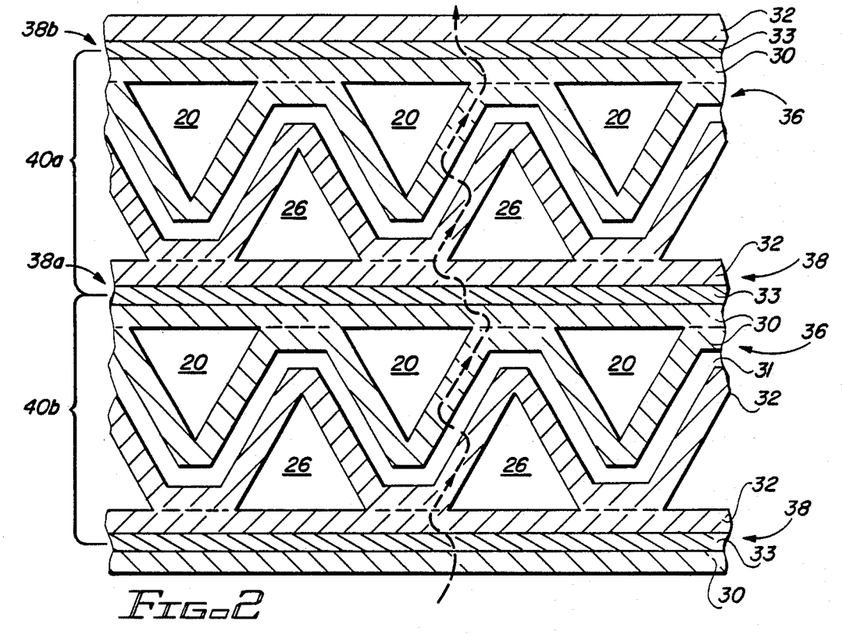
FIG. 2 is a partial, enlarged sectional view taken along line 2—2 of FIG. 1.

FIG. 2 illustrates an enlarged cross-section of the core 14 for the fuel cell 10 of FIG. 1. Within core 14 are formed a plurality of fuel passageways 20 and oxidant passageways 26 which are disposed parallel to one another and alternately adjacent one another. The passageways 20 for the fuel are formed with only an anode material 30 defining the exposed passageways walls; while the passageways 26 for the oxidant are formed with only a cathode material 32 defining the exposed passageway walls. Adjacent cell passageways 20 and 26 are separated by either an electrolyte wall 36 or by an interconnect wall 38. electrolyte wall portion 36 comprises a thin trilayer of electrolyte material 31 between the anode material 30 and the cathode material 32. The interconnect wall 38 comprises a thin trilayer of interconnect material between the anode and cathode materials 30 and 32. Two interconnect walls 38 can define the limit of one "cell" unit 40, however in the overall fuel cell 10, two adjacent cell units 40 share an interconnect wall 38.

The anode, cathode, electrolyte, and interconnect materials are selected and modified to comply with the following requirements: (1) electrically conductive aspects of the cathode, anode, and interconnect: (2) the ionic transport and electronic isolation aspect of the electrolyte; and (3) the gas porosity property of the cathode and anode and the gas impervious property of the electrolyte and interconnect. Likewise the structural integrity, thermal expansion and contraction ratios, and chemical compositions of the composite monolithic core are designed for the specific operational parameters of temperature, pressure, gas flow rates, voltage, and current densities necessary to provide optimal efficiency.

In a preferred embodiment of the invention, the interconnect and the electrolyte layers are thin (0.002–0.005 cm) while the sandwiching cathode and anode layers are perhaps the same thickness or possibly up to perhaps ten times this thickness (0.002–0.05 cm).

The monolithic core provides increased power density due to the increased active exposure areas of fuel and oxidant per the corresponding unit flow path volume, and due further to having only the active materials (the anode, cathode, electrolyte, and interconnect) in the core. The fuel and oxidant passageways 20 and 26, of the core 14 can be very small, and likewise the core walls can be thin but yet self supporting over the small distances across the defined passageways, making possible shorter current paths and reduced resistance losses, and minimizing diffusion losses by eliminating thick support tubes entirely.

The manifolds, 16 and 18 each include an oxidant passageway 58, 59 and a fuel passageway 56, 57 and a turning section generally designated by the numeral 24. Turning section 24 defines a plurality of fuel manifold passages 62 and a plurality of oxidant manifold passages 64 as will be described later.

It is envisioned that the fuel cell of the present invention can be used with either parallel flow or counter flow of the two working fluids. Therefore, for the purpose of clarity it is assumed that a parallel flow system is being used and therefore manifold 16 shall be referred to as the inlet manifold defining a fuel inlet conduit 56 and an oxidant inlet conduit 58 and manifold 18 shall be referred to as the outlet manifold defining a fuel outlet conduit 57 and an oxidant outlet conduit 59. Each manifold further includes the turning section 24.

Gaseous fuel is conveyed from a source (not shown) to the fuel inlet conduit 56 (FIGS. 1 and 3) formed within the inlet manifold 16 for flow through fuel manifold passageways 62 (FIG. 5) and then through the passageways 20 in the core 14 toward the fuel outlet conduit 57 formed within the outlet manifold 18. Likewise, oxidant is carried from a source (not shown) to the oxidant inlet conduit 58 (FIG. 3) formed within the inlet manifold 16 for flow through the oxidant manifold passageways 64 and in turn for flow axially through the oxidant passageways 26 toward the oxidant outlet conduit 59 formed within the outlet manifold 18. The fuel and oxidant reacts electrochemically across the electrolyte walls 36 separating the fuel and oxidant in the core 14. Fuel and oxidant not consumed in the core is discharged through the outlet manifold 18 and subsequently may be combusted with the other reaction products from the fuel cell 10 in an appropriate combustion chamber.

As can be best seen in FIG. 2, each electrolyte wall 36 is comprised of the layer of electrolyte 31 sandwiched between the layer of anode 30 and the cathode 32. Electrolyte wall 36 electrochemically reacts the fuel and oxidant being conveyed in the passageways 20 and 26, respectively, to develop an electrical potential across the electrolyte wall 36. Further, for all of the electrolyte walls thus confined between any pair of adjacent interconnect walls (38a and 38b, for example), there is an in-series electrical hookup of these cell units (40a, 40b, for example). The electrolyte walls 36 are alternated or backfolded in effect between the interconnect walls 38 so that the fuel and oxidant passageways 20 and 26 are likewise alternately disposed between any pair of adjacent inerconnect walls.

As will be appreciated, the cathode 32 and anode 30 layers of the electroylte walls 36 are porous to the degree required to allow the fuel and oxidant gases confined on the opposite sides thereof to be transported to the electrode/electrolyte interface, while the electrolyte material 31 and the interconnect material 33 in the electrolyte and interconnect walls are impervious and serve to isolate the fuel and oxidant gases completely from one another. Likewise, the electrolyte material 31 is electrically not conductive, so that electrons do not pass between the cathode and anode layers formed on opposite sides of the electrolyte, but the electrolyte material 31 does provide ionic conductivity for oxygen ion transfer between the cathode and anode. Moreover, both the cathode and anode layers, 32 and 30, are electrically conductive. The interconnect material 33 allows electrons to pass through it, thereby electrically connecting the anode material 30 and cathode material 32 of the cells on opposite sides of the electrolyte wall 36 together to provide a series connection of adjacent cells.

In a practical fuel cell of the type shown in FIGS. 1 and 2, many serially connected cells 40a, 40b, etc. will be provided, exceeding perhaps even two hundred. The outermost interconnect walls or the series connections between interconnect walls are connected electrically via conductors 45 and 46 to external terminals 50 and 52 of the fuel cell to provide a cumulative electrical output at the terminals (illustrated schematically in FIG. 1). The conductors 45 and 46 may be connected to the lowermost anode or overlying interconnect material 33, and the uppermost cathode or interconnect material. In this manner, the overall fuel cell voltage at the exterior terminals 50 and 52 might be of the order of between 10 and 100 volts. As the conductors 45, 46 will typically be formed of a high temperature conductive metal, it will be advantageous to have the conductors in a fuel environment (rather than an oxidizing environment) or to bleed a small amount of fuel over the conductors so as to minimize their oxidation.

Shown in FIGS. 3-6 is the manifolding system to be used in association with the fuel cell core 14. The inlet manifold 16 and the outlet manifold 18 are similar to each other in their ducting of the fuel and oxidant flows. Each defines oxidant inlet and outlet conduits: 58 and 59, and fuel inlet and outlet conduits: 56 and 57, for connection to suitable oxidant and fuel sources. As will be described below the manifolding 16 and 18 and the fuel cell core 14 can be formed as an integral piece.

Figures 3A, 3B:
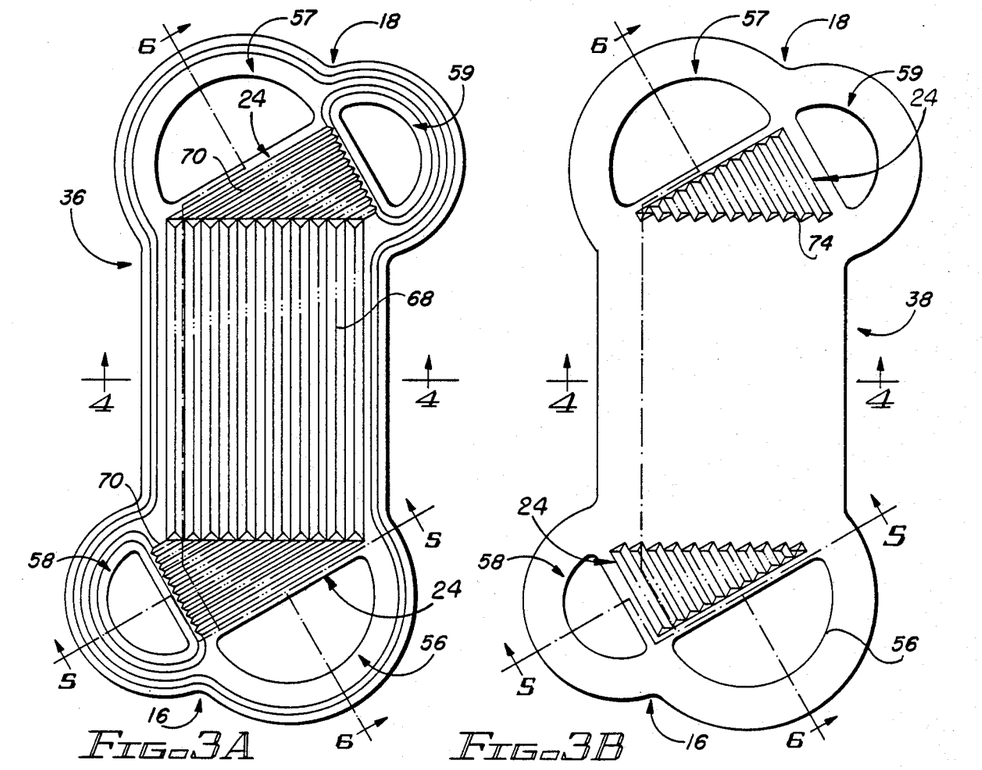
FIG. 3A is a top view of an individual electrolyte layer.
FIG. 3B is a top view of an individual interconnect layer.

Shown in FIGS. 3A and 3B are fuel cell core walls having inlet and outlet manifolds 16 and 18 integral therewith. FIG. 3A discloses the electrolyte wall 36 and FIG. 3B discloses the interconnect wall 38. Shown in FIG. 3A are electrolyte wall impressions or corrugations 68 formed between the manifolds 16 and 18, and which, when alternatively stacked with the interconnect walls 38, form the fuel and oxidant passageways. At each end of the electrolyte wall corrugations 68 are a plurality of manifold corrugations 70 which extend parallel with each other and the manifold corrugations at the opposite end of the fuel and oxidant passageways. Each manifold corrugation 70 has a height less than the height of the passageways 20 and 26 (see FIG. 5). Inlet and outlet manifold passageways 62 extend from the ends of the fuel cell core fuel passageways 20 to the fuel inlet and outlet conduits 56 and 57 formed internally to the inlet and outlet manifolds 16 and 18. Likewise, inlet and outlet oxidant manifold passageways 64 extend from the ends of the core oxidant passageways 26 to the oxidant inlet and outlet conduits 58 and 59 formed internally to manifolds 16 and 18.

Figures 4, 5, 6:
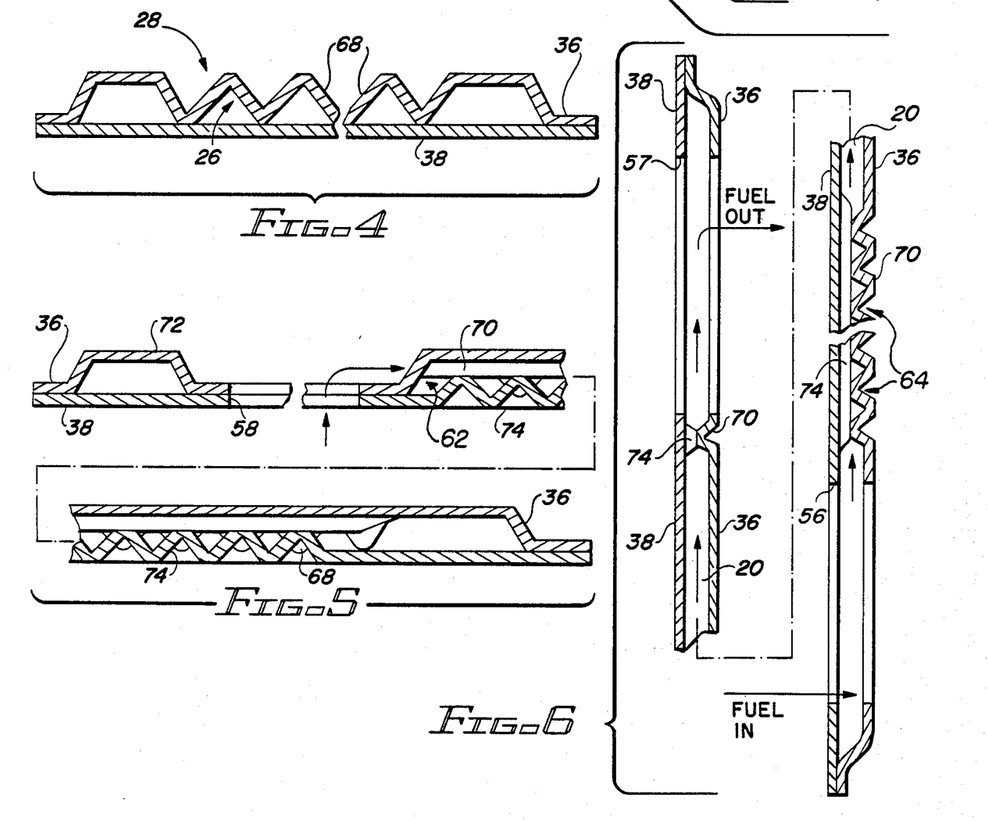
FIG. 4 is a sectional view along line 4—4 of FIG. 3.
FIG. 5 is a sectional view taken along line 5—5 of FIG. 3.
FIG. 6 is a sectional view taken along line 6—6 of FIG. 3.

FIG. 4 taken along lines 4—4 of FIGS. 3A and 3B details the cross-section of one interconnect wall 38 placed atop an electrolyte wall 36. The plurality of fuel passages 20 are clearly defined by the two walls while the plurality of oxidant passages 26 require a second interconnect wall in order to define the lower boundary of the oxygen passages.

FIG. 5 shows the manifolding of the present invention. As shown, the electrolyte wall 36 is placed atop the interconnect wall 38 and cross-sectioned as shown by lines 5—5 on FIGS. 3A and 3B. The interconnect wall 38 is generally flat except for the manifold corrugations 74 which form the inlet and outlet oxidant manifolding passages 64. The electrolyte wall 36 cross-sectional shows that it is crimped to form the channel 72, is then open to define the oxygen inlet conduit 58 before it is raised to the same height as channel 72. Corrugations 70 are shown to descend to some fraction of this height. In this case, shown to be approximately one half of this height. Fuel cell core corrugations 68 can also been seen at this view.

As best seen in FIG. 5, each electrolyte wall includes a hollow channel 72 which extend around the wall a short distance from the perimeter. The height of the channel 72 rises to the height of the corrugations 70 which form the oxidant manifold passageways 64. In this manner, the generally flat interconnect wall 38 lays atop the channel 72 and the corrugations 70.

The trilayer interconnect wall 38 is generally flat and includes interconnect wall manifold corrugations 74 which define inlet and outlet fuel manifold passageways 62. The corrugations 74 are generally perpendicular to the oxidant manifold passageways 64 when they are laid atop one another. Corrugations 74 extend upward approximately one-half the height of channel 72 of the electrolyte wall 36 from the generally flat surface of interconnect wall 38.

FIG. 6 shows the cross-sectional view along line 6—6 of FIG. 3. Shown is the interconnect wall 38 open near each end to define the fuel inlet and outlet conduits 56 and 57. Immediately downstream of the opening defining the fuel inlet conduit 56 are the electrolyte wall manifold corrugations 70 and the interconnect wall manifold corrugations 74 which have a height approximately one half of the height the electrolyte wall 36. Thereafter, a fuel passageway 20 is shown extending the length of the core. The fuel in the passageway 20 then encounters the electrolyte wall manifold corrugations 70 and the interconnect wall manifold corrugations 74 which form one boundary of the fuel manifold passageways 62. The fuel then enters the fuel outlet conduit 57 formed integral with the electrolyte and interconnect walls for passage out of the fuel cell.

Figure 7:
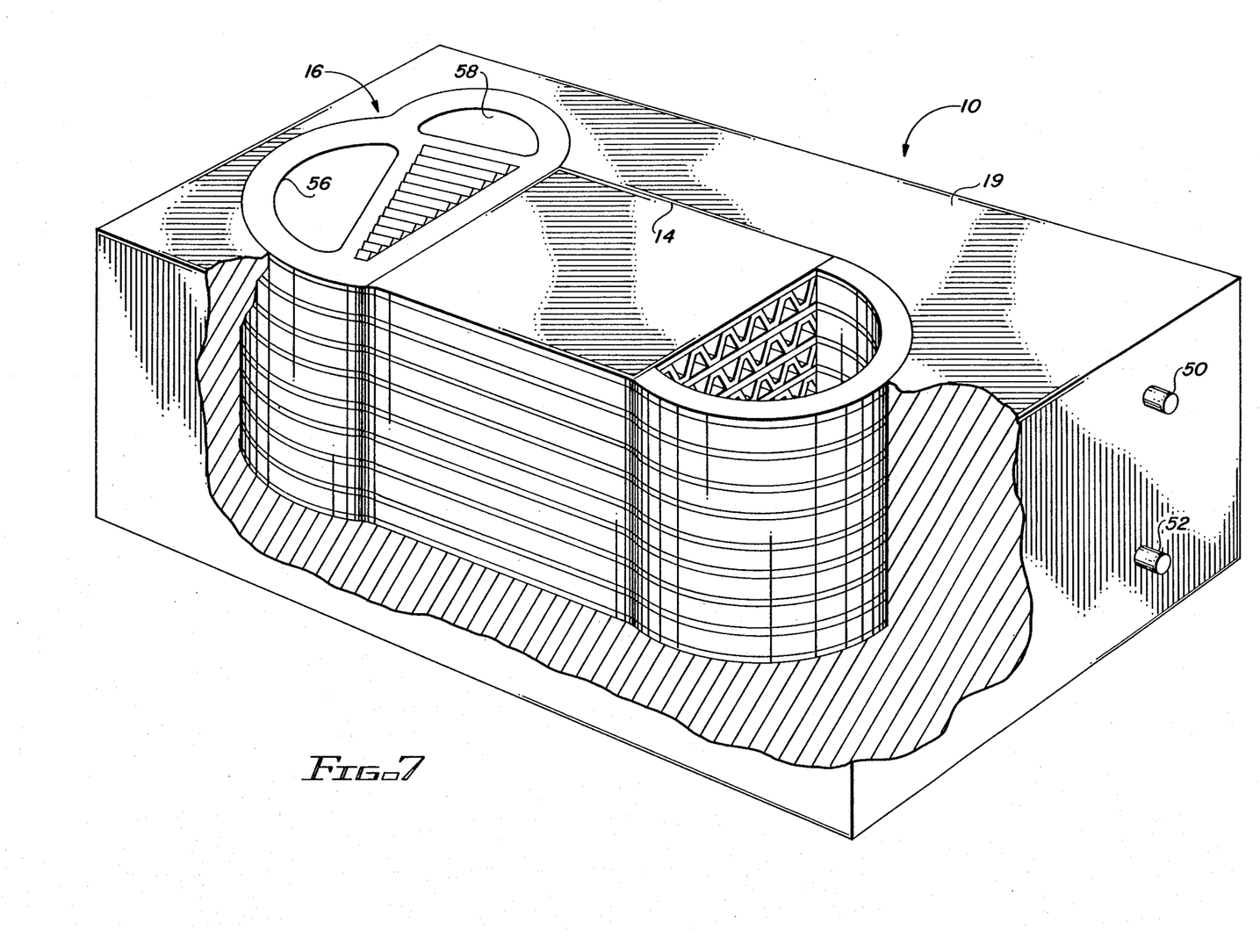
FIG. 7 is a perspective view, partially broken away for clarity of the fuel cell of the present invention incorporating fluids in parallel flow wherein the outlet manifold has been removed.
Figure 8:
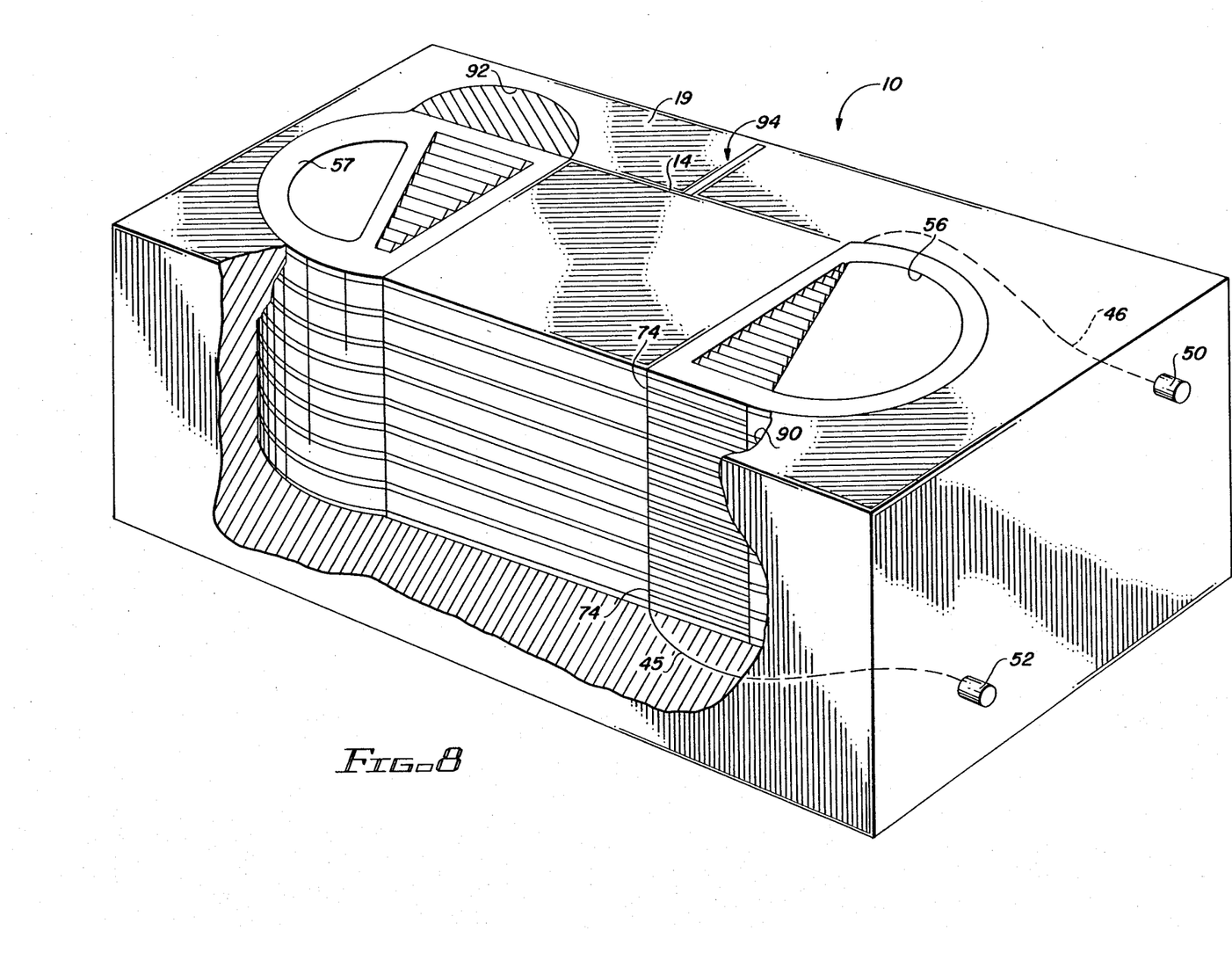
FIG. 8 is a perspective view, partially broken away for clarity of the fuel cell of the present invention wherein the inlet and outlet manifold conduits for the oxidant has been removed.

As stated above the discussion of the flow of the fuel and oxidant has been directed to a parallel flow system. When utilizing a parallel flow system it is envisioned that the outlet manifold 18 can be entirely eliminated or replaced by a manifold wherein the fuel and oxidant are ducted together, see FIG. 7. In this manner the fuel and oxidant are mixed for combustion immediately upon exiting the core. In another embodiment, either the fuel inlet and outlet conduits 56, 57 or the oxidant inlet and outlet conduits 58, 59 can be eliminated, see FIG. 8. In this embodiment, one fluid can be input into the fuel cell at an opening 90 formed in insulation 19 at one end and can be removed from a second opening 92 at the other end. It is important that there is some barrier 94 placed between the two openings 90 and 92 to prevent the fluid at the inlet end mixing with the fluid at the outlet end. In yet another embodiment (not shown) of the parallel flow type, the outlet manifold 18 can be eliminated and either the fuel or oxidant conduit can be eliminated at the inlet end. This embodiment is a combination of the embodiments of FIGS. 7 and 8. If the fluids are in a counterflow reaction then one could use the same manifolding system set forth in FIG. 8.

PREFERRED METHOD OF FABRICATING THE FUEL CELL

Figure 9:
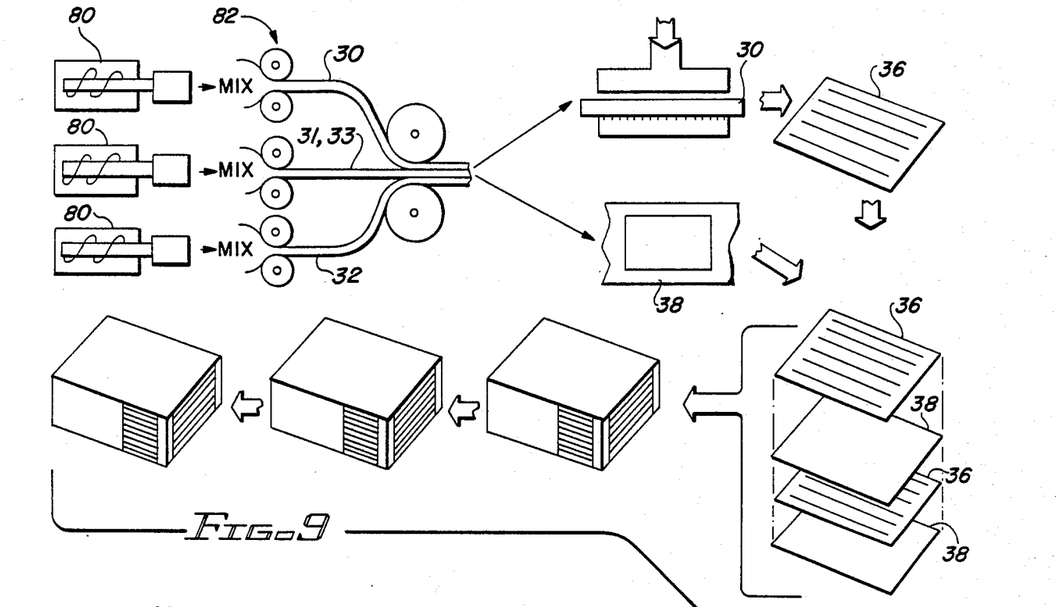
FIG. 9 is a diagrammatic flow chart of the steps required to form a fuel cell of the present invention.

Shown in FIG. 9 is a schematic diagram of the process to manufacture a fuel cell of the present invention. Powders for each of the materials —strontium lanthanum maganite for the cathode, yttria-stabilized zirconia for the electrolye, magnesium-doped lanthanium chromite for the interconnect and a cermet of cobalt or nickel metal with stabilized zirconia for the anode —are first prepared so that the particle size ranges from 1 microns to 10 microns. The powder is then mixed with the desired binder and pasticizer in a high intensity mixer 80. For example, to form the electrolyte material, zirconia and yttria are mixed in approximate percentages of 87 to 13 by weight. The binder and plasticizer make up approximately 10-40%, by weight, of the total mix and preferably approximately 18%. The amounts of binder and plasticizer being approximately equal. Porosity may be controlled by using larger sized particles, or by the use of the higher percentage of binder.

Typically, the binder used can be selected from the group comprising: synthetic rubber, thermosetting plastics, polyvinyl alcohol or polymer systems which thermally decompose without cross-linking. The plasticizer chosen is one that is pliable, elastic and allows low temperature forming of the binder system, e.g. butyl benzol thalate, solvents of the thalate group.

The powder, binder and plasticizer are combined in a high intensity mixer at room temprature. The mixing disperses the powder particles and coats each particle with binder. The mixing action also raises the temperature through friction to 300° F. and softens the plasticizer. Typically, the time for mixing can be 0.5 to 10 minutes with 2 minutes generally being sufficient.

The mixed material is removed from the mixer and rolled, preferably immediately after mixing to retain the heat generated by the mixing. As shown, the rolling step is carried out by a roll mill 82. Each roller is generally heated to approximately 50-300° F. depending on the desired thickness to assist in the rolling operation. Each material (anode, cathode, electrolyte and interconnect) material is roll milled into a tape 30, 31, 32 and 33 of the desired thickness. It should be noted that the numerals 30, 31, 32, and 33 designate the material as well as a tape or layer formed of that material. Thereafter, a multilayer tape 36 or 38 is roll-milled from at least three of the other tapes, i.e. 30, 31 or 32 and 33. During this step each tape is friction bonded to the adjacent tape(s). It is important that no voids are formed between the tape layers during this rolling step. The resulting multilayer tape may be further calendered if required to reduce its thickness. Furthermore, it is envisioned that each multilayer tape can be formed of more than three layers of tape, if required, to increase core efficiency.

In order to increase the efficiency of the fuel cell it is advantageous, but not necessary, to corrugate the electrolye tape to achieve greater surface area. This can be accomplished by compression molding, vacuum forming or by gear forming. It is important not to get any material flow during corrugation, thereby retaining the desired layer thickness.

Before stacking, the fuel cell core in its green state is solution treated with any solvent (i.e. alcohol) which will assist in dissolving the binder. Once the multilayer tapes are cut to size and the electrolyte tape has been subjected to the desired forming process, the individual layers are alternately stacked to form the fuel cell core 14. Binder extraction is done in a non-reactive, air or vacuum furnace by uniformly heating the core slowly up to approximately 1000° F., depending on the binder used, so that the binder changes into a gaseous phase. The heat up rate is important in that it must be slow enough not to cause blistering or the formation of gas pockets between the multilayered tapes. Binder extraction removes all but a small amount of residues (approximately 1% by weight of the total binder) and results in approximately 0-10% shrinkage. After the binder has been removed the core 14 can either be air cooled or be placed within the sintering furnace.

Sintering is a rapid fire process which results in a densification of the core materials. During sintering the furnace is heated to approximately 1200-1600° F. whereupon the ceramic particles which are in proximity to one another are bonded together to form a rigid fuel cell core 14. The interconnect and electrolyte materials undergo a 94% densification which forms a gas tight barrier. The anode and cathode materials have a 20% to 50% porosity after sintering. The more porous, the more continuous an electronic flow between the two gases.

Various modifications to the desired and described apparatus and method will be apparent to those skilled in the art. Accordingly, the foregoing detailed description of the preferred embodiment and apparatus should be considered exemplary in nature, and not as limiting to the scope and spirit of the invention as set forth in the appended claims.

What is claimed is:

1. A method of constructing a monolithic fuel cell core made entirely of trilayer electrolyte and interconnect walls, the method comprising the steps of:

mixing powders required to make an anode, a cathode, an electrolyte and an interconnect material separately with a plasticizer and a binder to form a batch of each of said materials;

rolling each batch of said materials into a tape having a desired width and thickness;

rolling the tape of anode and the tape of cathode material on each side of said tape of electrolyte and interconnect materials, thereby forming a trilayer electrolyte wall and a trilayer interconnect wall;

cutting said trilayer tapes to length;

molding at least one of said trilayer tapes into a desired shape;

alternately stacking the two trilayer tapes to the desired height to form said core;

extracting the binder from the core; and sintering the core to form the monolithic fuel cell core.

2. The method of claim 1 wherein said step of mixing is done in a high intensity mixer.

3. The method of claim 2 wherein said step of mixing further includes heating the batches by high speed mixing.

4. The method of claim 1 wherein said steps of forming are performed by roll milling said material in a two roll mill.

5. The method of claim 4 wherein said material is heated during said steps of forming.

6. The method of claim 1 wherein said tapes are further calendered to the desired thickness.

7. The method of claim 1 wherein said step of molding is performed by compression molding.

8. The method of claim 1 wherein said step of molding is performed by vacuum forming the cut tapes.

9. The method of claim 1 further including the step of cooling said core to room temperature after the step of extracting the binder.

10. A method of constructing a monolithic fuel cell core and manifolding made of electrolyte and interconnect walls, the method comprising the steps of:

mixing anode, cathode, electrolyte and interconnect powders separately with a binder and a plasticizer to form four separate batches of an anode, cathode, electrolyte and interconnect material;

forming a separate flexible tape of each material with the desired width and thickness;

forming two flexible trilayer tapes of desired thickness one trilayer tape comprising a layer of electrolyte material sandwiched between an anode tape and a cathode tape and the other trilayer tape comprising an interconnect tape sandwiched between an anode tape and a cathode tape;

cutting said two trilayer tapes to length;

molding at least one trilayer tape to the desired shape;

alternately stacking said trilayer tapes to form the fuel cell core and manifolding;

extracting said binder from each tape; and sintering the core and manifolding to form a monolithic structure.

11. The method of claim 10 wherein said step of mixing is done in a high intensity mixer.

12. The method of claim 11 wherein said step of mixing further includes heating the batches by high speed mixing.

13. The method of claim 12 wherein said steps of forming are performed by roll milling said material in a two roll mill.

14. The method of claim 13 wherein said material is heating during said steps of forming.

15. The method of claim 14 wherein said tapes are further calendered to the desired thickness.

16. The method of claim 15 wherein said step of molding is performed by compression molding.

17. The method of claim 15 wherein said step of molding is performed by vacuum forming the cut tapes.

18. The method of claim 10 further including the step of cooling said core to room temperature after the step of extracting the binders.

19. A method of constructing a monolithic fuel cell core and manifolding comprising the steps of:

mixing powders with a binder and a plasticizer to form at least four separate batches of materials;

forming a separate, flexible tape of each material;

forming two flexible multilayer tapes, each multilayer tape comprising at least three separate, flexible tapes;

cutting said two flexible multilayer tapes to size;

molding at least one of said multilayer tapes to the desired shape;

alternately stacking said multilayer tapes to form the fuel cell core and manifolding;

extracting said binder from each multilayer tape; and sintering the core and manifolding to form a monolithic structure.

20. The method of claim 19 wherein said step of mixing is done in a high intensity mixer.

21. The method of claim 20 wherein said step of mixing further includes heating the batches by high speed mixing.

22. The method of claim 21 wherein said steps of forming are performed by roll milling said material in a two roll mill.

23. The method of claim 22 wherein said material is heating during said steps of forming.

24. The method of claim 23 wherein said tapes are further calendered to the desired thickness.

25. The method of claim 24 wherein said step of molding is performed by compression molding.

26. The method of claim 24 wherein said step of molding is performed by vacuum forming the cut tapes.

27. The method of claim 19 further including the step of cooling said core to room temperature after the step of extracting the binders.

* * * * *